United States Patent [19]

Floe

[11] Patent Number: 5,421,612
[45] Date of Patent: Jun. 6, 1995

[54] TRAILER AND TONGUE STRUCTURE

[76] Inventor: Wayne Floe, HCR 3 Box 609, McGregor, Minn. 55760

[21] Appl. No.: 943,312

[22] Filed: Sep. 10, 1992

[51] Int. Cl.$^6$ .............................................. B62D 63/06
[52] U.S. Cl. .................. 280/789; 280/491.5; 414/482; 414/483
[58] Field of Search ...................... 280/511, 489, 491.5; 414/482, 483, 484, 485; 296/181

[56] References Cited

U.S. PATENT DOCUMENTS

| | | | |
|---|---|---|---|
| 1,967,425 | 7/1934 | Petersen | 280/789 |
| 2,834,486 | 4/1958 | Clark | 414/483 |
| 3,214,047 | 10/1965 | Moye | 280/789 |
| 3,885,690 | 5/1975 | Van Slambrouck | 414/485 |
| 4,222,698 | 9/1980 | Boelter | 414/482 |
| 4,273,351 | 6/1981 | Salamander | 280/789 |
| 4,662,650 | 5/1987 | Angehrn et al. | 280/789 |
| 4,921,390 | 5/1990 | Baines | 414/483 |
| 5,215,331 | 6/1993 | Pittman | 280/789 |
| 5,259,720 | 11/1993 | Lobner | 414/482 |

Primary Examiner—Margaret A. Focarino
Assistant Examiner—Christopher P. Ellis
Attorney, Agent, or Firm—Charles A. Johnson

[57] ABSTRACT

An improved trailer structure constructed of lightweight material and especially adapted for hauling snowmobiles is described. An improved tongue structure, having a pair of opposed channels extending longitudinally, is shown arranged to cooperate with a hitch structure on a vehicle to allow an enhanced turning radius between the trailer and the vehicle. The improved tongue works in cooperation with an integrally formed tongue support channel for vertical and lateral support. An improved rear frame member protects associated lights and has a ramp member to protect the deck of the trailer when objects are slid onto the trailer from the rear. Side panel members and support beams support the trailer deck and can support associated stake holders for mounting auxiliary removable sides and ends on the trailer frame around the trailer deck. Each of the components is integrally formed by extruding a light-weight material, and cut to length for assembly.

18 Claims, 3 Drawing Sheets

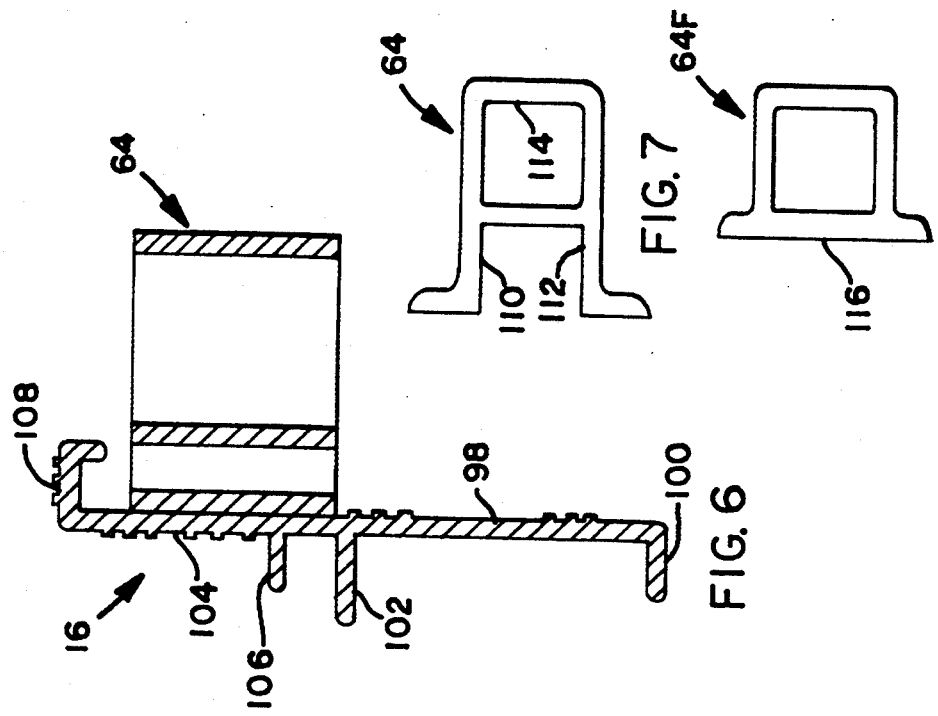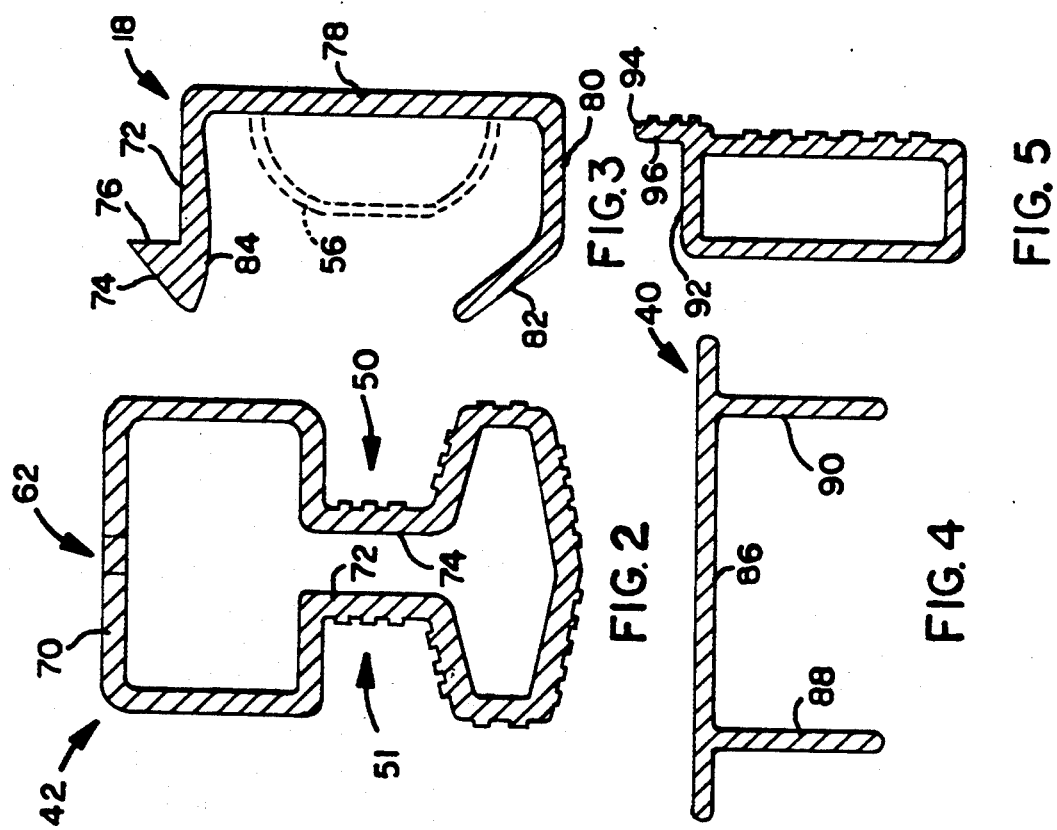

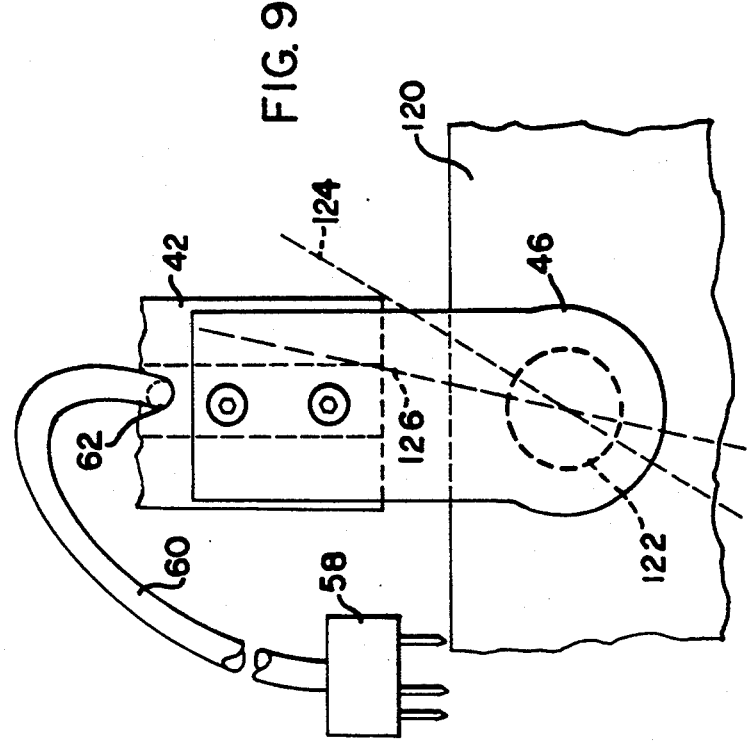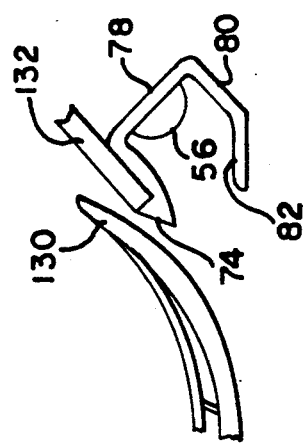

TRAILER AND TONGUE STRUCTURE

BACKGROUND OF THE INVENTION

1. Field of the Invention

The invention relates generally to trailer frame structures; and, more particularly, to a light-weight structure having an improved tongue structure and improved structural frame members.

2. State of the Prior Art

Various structures for trailers that are to be towed behind vehicles are known. One such class of trailer structures that have special requirements is the class of trailers used to haul snowmobiles and other devices that are readily propelled in one direction, but are difficult to move in the opposite direction. Generally, these trailers are supported on two wheels, are preferably light in weight, and often have a wood deck and other wooden parts. Various forms of ramps and tilt beds are known and used for loading vehicles to be hauled. In prior art trailer structures the rear edge of the deck is often exposed to wear and damage from snowmobile skis sliding onto the deck. In other prior art trailer structures an auxiliary wear strip fastened over the rear edge. The wear strips often become damaged or detached from the deck due to repeated loading operations. These tendencies to wear and damage in the prior art trailer structures result in a requirements for considerable maintenance and generally diminishes the value and utility of such trailer structures.

Another aspect of prior art snowmobile trailer structures were those that allowed the deck to swivel laterally with respect to the tongue to thereby allow the snowmobile to be driven forward and off the trailer. These swivel or rotating structures were safety hazards in that they could malfunction while being towed. Such malfunction often resulted either in the trailer becoming uncontrollable or the hauled snowmobile becoming dislodged from the trailer. Neither situation is acceptable.

Most recreational trailers utilize a tongue structure that may be characterized as a box beam that is constructed of a closed cross-sectional shape. Most often the shape is square or rectangular. Flat, solid or channel shapes are generally not used because these shapes are unduly heavy when the necessary strength is provided, and the shapes are more easily bent or deformed than the box beam configuration.

The tongue is adapted to support a hitch at one end, where the hitch is designed for coupling with a mating hitch structure on a towing vehicle.

A common method of unloading snowmobiles, or other devices that need forward movement, is to turn the towing vehicle at a sharp angle to the trailer tongue, thereby allowing the snowmobile to drive down an auxiliary ramp at the front of the trailer and past the end of the towing vehicle. There is a major problem with this procedure. When the turn is too severe because the angle of the towing vehicle to the trailer tongue is too sharp, the side of the tongue may engage the support of the mating hitch on the towing vehicle. If the engagement is too severe, the tongue may become dented or bent, or the vehicle hitch may be damaged. If the force on the side of the tongue is severe enough, the torque on the fasteners that mount the hitch on the tongue may cause the fasteners to be weakened, bent, break, or pull away from the tongue. This type of damage and the damage that can occur if the trailer and vehicle jackknife are common and are clearly undesirable.

Various prior art trailer frames have been constructed of steel, wood, and combinations of materials. Trailers such as used for transporting snowmobiles characteristically are used in inclement weather and are often used in snow an wet conditions. These conditions tend to cause rust and damage to steel parts and to cause rot in wooden frame parts. These damages require maintenance and reduce the longevity of such trailer structures.

Prior art metal frames utilized bent and formed structural members. This type of fabrication generates deformation of material at bend areas and tends to result in a weakened structure. This is especially a problem with light weight material such as aluminum.

It has been common in prior art tilt bed trailers to have longitudinal members mounted beneath the trailer bed and arranged parallel to the tongue to hold the tongue alignment. Such arrangements work for lateral stability, but do not provide any substantial vertical support between frame spans that support the trailer deck. Damage often results to such structures if the trailer deck is caused to return to the supported down position with too much force as can occur if the load Is applied too rapidly when the bed is tilted.

In many situations it is desirable to be able to utilize auxiliary sides and ends. While it is known to use removable sides having downwardly extending stakes that are removably retained in stake holders, or boots, the stake holders have usually been constructed of bent, sheared, and welded component parts. These types of prior art structures are expensive to manufacture, and often add unneeded weight to the frame.

The labor and expense to form these elements are great, and more uniform method of manufacture is desirable. It has not been known to form the trailer frame members from extruded light-weight material such as aluminum.

OBJECTS

It is primary objective of this invention to provide an improved trailer structure.

Yet another object is to provide an improved tongue for use with trailers.

A further object is to provide an improved tongue that allows cooperation with a vehicle-mounted hitch assembly to maximize the permissible angle between the tongue and the hitch assembly.

Still another object is to provide an improved trailer tongue that has a predetermined closed cross-section for strength with a pair of opposed longitudinal channels for cooperating with a vehicle-mounted hitch assembly to avoid damage to the tongue during extreme turns.

Yet a further object is to provide an integrally formed tongue channel for providing both vertical and lateral tongue support.

Another objective is to provide an improved rear frame member for use as part of a trailer frame.

Yet a further object is to provide a rear frame member that has a ramp structure to protect the end of an associated trailer deck.

Still a further object is to provide an improved rear frame member that protects tail lights from damage during loading.

Another object is to provide a light weight and corrosion resistant trailer frame that is sturdy.

Yet another objective is to provide an improved trailer frame constructed of aluminum frame members.

Another object is to provide an improved trailer frame assembly made of members that are fabricated from extruded aluminum members for maximum strength and minimum weight.

A further object is to provide extruded frame members that can be uniformly extruded from a lightweight material such as aluminum, and can be cut to predetermined lengths for constructing trailer frames of different sizes, thereby reducing the cost of manufacture.

Yet a further object is to provide extruded aluminum stake holders that can be safely and securely mounted to a light-weight trailer frame.

Still a further object is to provide an improved trailer frame that is relatively maintenance free.

These and other more detailed and specific objectives will become apparent from a consideration of the following description of the invention.

SUMMARY OF THE INVENTION

The present invention includes a light-weight aluminum trailer frame structure with an improved tongue structure that minimizes undesired contact between the tongue and a support structure of a vehicle-mounted hitch when the vehicle turns. The tongue structure has a predetermined cross-sectional shape with opposed longitudinally extending channels arranged to cooperate with the support structure of the vehicle-mounted hitch to minimize unwanted contact between the tongue and the support structure to avoid damage to the tongue or the hitch.

The trailer frame is comprised of extruded aluminum members that only require cutting to length, where each member has a surface for supporting the trailer deck. The main structural elements are of a box beam configuration having a generally rectangular shape and cross-section. Side panels hold the beams in place and support the deck edges.

The rear frame member generally has a channel cross-section and is arranged for mounting lights within the channel recess to protect them from damage during loading. The rear member has a lower limit, or lip portion for limiting downward movement of the rear of the trailer by contacting the ground or other support surface. The limit portion can also support a ramp for rear loading. The upper portion of the rear member has a ramp structure to protect the rear edge of the trailer deck when objects are slid onto the trailer from the rear.

An integrally formed tongue channel Is provided to give both vertical and lateral support for the trailer frame on the tongue structure.

Integrally formed stake holders are provided to support auxiliary side and front members on the trailer frame.

All of the component parts are integrally formed from extruded light-weight material and cut to lengths required for assembly, thereby providing an efficient and cost-effective manufacturing system for various size trailer frames.

BRIEF DESCRIPTION OF THE DRAWING

FIG. 2 is a cross-sectional view taken a line 2—2 in FIG. 1, and shows the shape of the improved tongue;

FIG. 3 is a cross-sectional view taken at line 3—3 in FIG. 1, and shows the shape of the rear frame member and the ramp structure;

FIG. 4 is a cross-sectional view taken at line 4—4 in FIG. 1, and shows the shape of the tongue-engaging structure;

FIG. 5 is a cross-sectional view taken at line 5—5 in FIG. 1, and shows the shape of the front support frame beam;

FIG. 6 is a cross-sectional view taken at line in FIG. 1, and shows the shape or side panel with associated stake holder;

FIG. 7 is a top plan view of a stake holder used on a side panel;

FIG. 8 is a top plan view of a stake holder used with a front support beam;

FIG. 9 is a partial plan view of the tongue with a hitch in cooperation with a ball hitch mounted on a towing vehicle; and FIG. 10 is a partial side-elevation view of the tip of a ski member about to engage the ramp portion of the rear frame member when positioned for leading

DESCRIPTION OF THE PREFERRED EMBODIMENT

Figure 1:
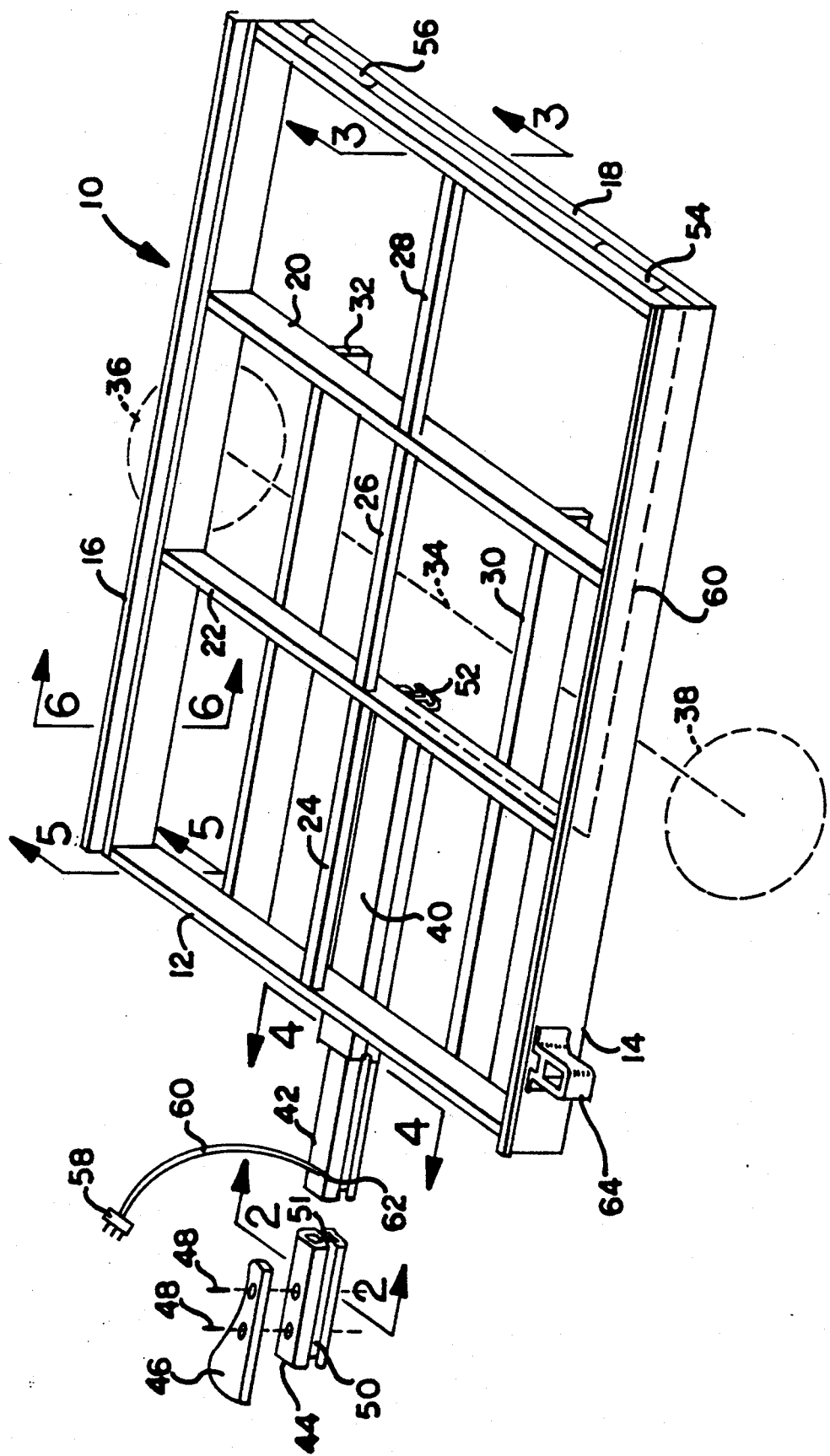
FIG. 1 is a perspective view of a trailer frame and associated tongue having a pair of opposed channels disposed at opposite sides and running longitudinally.

FIG. 1 is a perspective view of a trailer frame and associated tongue having a pair of channels disposed at opposite sides and running longitudinally. The trailer frame 10 is made up of front beam 12, side panels 14 and 16, and rear channel member 18, each of which has a deck support portion, as will be described below. A pair of cross beams 20 and 22 are spaced front-to-back by spacers 24, 26 and 28. A pair of frame support members 30 and 32 are positioned parallel to one another and are arranged longitudinally to side support panels 14 and 16. These support members 30 and 32 are arranged for providing support to the entire frame 10 on an axle, represented by dashed line 34, and on a pair of associated wheels shown as dashed lines 36 and 38.

A generally channel shaped tongue mount 40 is located and affixed to the undersides of front beam 12 and cross beam 22, and is utilized for providing a vertical span support, as well as a lateral support for tongue 42.

The front end 44 of tongue 42 is adapted to have a hitch 46 attached as by bolts (not shown) extended through holes aligned on dashed lines 48. Tongue 42 has longitudinal opposed channels 50 and 51 extending along at least a portion of its length.

For fixed tongue trailer frames, tongue mount 40 would be firmly affixed to tongue 42, as by bolts, welding, or other suitable interconnection. For those trailer frames that are characterized as tilt bed, end 52 of tongue 42 is pivotally mounted (not shown) to the tongue mount 40 near end 52. A releasable tongue catch (not shown) is mounted on the outside of front beam 12 and operates to releasably couple tongue 42 within tongue mount 40. When the tongue catch is released, trailer frame 10 is allowed to rotate about axle 34 in a clockwise direction until the bottom of rear channel 18 touches the surface, thereby allowing a snowmobile or other vehicle to drive onto the trailer. Once weight is placed forward on the trailer, the frame rotates back until the tongue mount 40 re-engages tongue 42 and the tongue catch is activated to hold the tongue in place. The tongue catch can be any well-known commercially available manually or power operated catch and release mechanism. Rather than use a releasable catch, mating holes can be drilled through sides 88 and 90 of tongue mount 40 and through tongue 42 in front of beam 12. A bolt or pin (not shown) passed through such mating holes provides a strong structural support and may still be easily removed to allow bed tilt.

Rear channel 18 has a pair of tail lights 54 and 56 mounted within the channel, as will be described in more detail below, so that the lights are protected from breakage or damage during loading. Electric power is provided from the tow vehicle through plug 58 and cable 60. Cable 60 extends through hole 62 in the top of tongue 42 and runs inside tongue 42 toward end 52. The cable 60 then is run inside beams 22 and 14 to the rear where electrical connection is made to lights 54 and 56. Running cable 60 inside the tongue and the beams protects it from damage and breakage. An alternative connection for cable 60 can be provided. The cable can be extended out through end 52 and attached externally to the underside of spacers 26 and 28, and extended to the back of end channel 18. Either interconnection will function.

A desired number of stake holders such as stake holder 64, can be mounted at desired points along side panels 14 and 16. A slightly differently configured type of stake holder, as will be described in more detail below, can be mounted as desired on the front side of front support beam 12.

The tongue 42, end channel member 18, tongue mount 40, side panels 16, stake holders 64, and the beams are all fabricated from aluminum and formed in shapes that will be described in more detail below. The beams and spacers are all adapted to support a trailer deck (not shown) that characteristically will be constructed of plywood or some other suitable material. The aluminum members are fabricated by heating and formed by extruding to the desired shapes, and are joined together by welding or by corrosion resistant fastener devices as needed. The extrusion process provides members that are strong and are not stressed by bending and forming processes. The extruded structures are cut to length for the size trailer frame desired, thereby providing an efficient and cost-effective manufacturing process.

FIG. 2 is a cross-sectional view taken at line 2—2 in FIG. 1, and show the shape of the improved tongue. Tongue 42 has an upper generally rectangular portion with a support surface 70 that is about 3.0 inches in width, and a lower approximately oval portion, separated by walls 72 and 74 to form channels 50 and 51. The lower oval shaped portion and the longitudinal ridges are designed to provide strength. The wall thickness can be nominally 0.188 inch for a light-weight trailer, and can be thicker as needed for heavier duty trailers.

FIG. 3 is a cross-sectional view taken at line 3-3 in FIG. 1, and shows the shape of the rear channel member and ramp structure. The channel member 18 has a deck support surface 72 with a ramp structure 74 formed at one end thereof. The surface of ramp structure 74 is characteristically at about 45 degrees and has a deck protection surface 76 perpendicular to support surface 72. The other end of support surface 72 is formed at right angles with the back member 78. A lower member 80 is formed at about right angles with back member 78 and has lip member 82 formed at about 45 degrees from the other end thereof. These member form a channel that effectively protects the lights while having them readily visible from the rear. The general wall thickness is nominally 0.156 inch for a light-weight trailer, and can be lighter or heavier as needed for the designed trailer capacity. Channel member 18 can be 3.5 inch from bottom to deck bearing surface 72, and deck edge protection surface 76 will be high enough to cover the edge of the selected deck material. The added radius 84 below ramp surface 74 is provided for extra strength.

FIG. 4 is a cross-sectional view taken at line 4-4 in FIG. 1, and shows the shape of the tongue engaging structure. Tongue mount 40 has a lower tongue engaging surface 86 that cooperates with surface 70 of tongue 42, and a pair of downwardly extending walls 88 and 90 for slidably engaging the sides of the upper portion of tongue 42 and providing lateral stability thereto. The tongue mount is nominally 0.188 inch in thickness for the light-weight trailer frame. Walls 88 and 90 are spaced apart approximately 3.03 inches, and the over-all width of tongue mount 40 is about 5.4 inches.

FIG. 5 is a cross-sectional view taken at line 5—5 in FIG. 1, and shows the shape of front frame support beam 12. The beams are all essentially box beams, and have an upper deck support surface 92. Beam 12 has its support surface 92 in cooperation with flange member 94 to form deck edge protection surface 96. The nominal thickness can be 0.125 inch, and the height is selected to match the height of the other frame members, and for the light-weight frame can be about 3.5 inches.

FIG. 6 is a cross-sectional view taken along line 6—6 in FIG. 1, and shows the shape of a side panel with associated stake holder. Side panel 16 has a lower vertical portion 98 between lower lip 100 and deck support flange 102 with a spacing therebetween of about 3.5 inches. An upper portion 104 has deck retention flange 106 in cooperative relationship to deck support flange 102. The upper end of portion 104 is formed with a top rail 108 for providing strength and rigidity. Side panel 16 has an over-all height of about 7.0 inches, and upper portion 104 assists in keeping hauled items from slipping off from the side of the trailer.

A stake holder 64 is shown mounted to the outside of upper portion 104, and is of a size and shape adapted to receive and support an associated side stake.

FIG. 7 is a top plan view of a stake holder used on side panels. Off-set legs 110 and 112 hold the stake enclosure out from the side of panels 14 and 16 to clear top rail 108. A useful stake opening 114 can be approximately 2 by 2 inches, and the span to the outer edges of legs 110 and 112 is about 4.3 inches.

FIG. 8 is a top plan view of a stake holder used with a front support beam. Since support beam 12 does not have a top rail 108, the off-set is not required, and the stake holder 64F can be mounted directly at surface 116.

FIG. 9 is a partial plan view of a tongue with hitch in cooperation with a ball hitch mounted on a towing vehicle. In this configuration a support plate 120 supports ball hitch 122 that cooperates with hitch 46 mounted to tongue 42. In this arrangement it can be seen that when the vehicle turns counter-clockwise, plate 120 will move counter-clockwise until it reaches an angle represented by dashed line 124. This would be the normal limit of turn without damage to tongue 42, if a prior art tongue structure is used. With the improved tongue of this invention, plate 120 can continue to move counter-clockwise until it is aligned with dashed line 126 because plate 120 can move into one of the longitudinal channels without engaging the tongue structure until it approaches the bottom of the channel.

FIG. 10 is a partial side elevation view of the tip of a ski member nearly engaging the ramp portion of the rear frame channel member when positioned for loading. In this arrangement the lip surface 82 is in contact with the surface, and ramp surface 74 is positioned to allow ski 130 to slide upward onto deck surface 132. This functions for a tilt bed trailer, but it should also be understood that lip 82 can be utilized with an auxiliary ramp (not shown) to allow the ski members 130 to slide upwardly onto surface 132 for fixed bed trailers. In either event the channel structure protects the lights from damage.

Having described the preferred embodiment of the invention in conjunction with the drawings, it can be seen that the various stated purposes and objectives have been achieved, and that various modifications and extensions will become apparent to those skilled in the art within the spirit and scope of the invention. Accordingly, what is intended to be protected by Letters Patent is set forth in the appended Claims.

I claim:

1. For use with a towing vehicle having a trailer hitch on a hitch support, and a trailer having ground engaging wheels mounted on an axle and support members mounted on an axle, a trailer frame for supporting a trailer deck comprising:
   a front beam having a first deck support surface and a flange adjacent said first deck support surface arranged to cover the front edge of a deck, said front beam adapted to be coupled to the support members;
   an integrally formed rear channel member having a second deck support surface, a ramp surface at a predetermined angle and in cooperative relation to said second deck support surface and arranged to protect the rear edge of the deck, a lower member, and a lip member formed at an angle to said lower member;
   at least one supporting beam intermediate said front beam and said rear channel member and having a third deck support surface;
   a pair of side panels affixed to associated ends of said front beam, each having a longitudinal deck support flange and a spaced-apart parallel deck retention flange;
   a tongue mount channel affixed to said front beam and to said at least one support beam, and arranged to provide vertical span support and lateral tongue support; and
   a tongue having a first portion in cooperative relationship to said tongue mount channel and a second portion extending forward from said front beam, said tongue including a pair of longitudinal opposed channels extending along at least a portion of said tongue, whereby said pair of longitudinal opposed channels can cooperate with the hitch support on the towing vehicle for avoiding damage to said tongue during turning.

2. A trailer frame as in claim 1, and further including a plurality of stake holders, each integrally formed and affixed at predetermined positions on said or side panels and said front beam.

3. A trailer frame as in claim 1 wherein said front beam, said rear channel member, said at least one support beam, said pair of side panels, said tongue mount, and said tongue each have a separate predetermined cross-section.

4. For use with a trailer frame adapted to being pulled by a towing vehicle having a trailer hitch on a hitch support a tongue comprising:
   an elongated member having a predetermined length and cross-section, and having a first portion adapted to be coupled to the trailer frame and a second portion forwardly extending to support a hitch for coupling to the trailer hitch on the towing vehicle, said elongated member including a pair of opposed longitudinal channels extending along at least said second portion, whereby said pair of opposed longitudinal channels can cooperate with the hitch support on the towing vehicle to avoid damage to said elongated member during turning of the towing vehicle.

5. A tongue as in claim 4, wherein said elongated member is integrally formed of extruded aluminum.

6. A tongue as in claim 4, and further including an integrally formed tongue mount channel affixed to the trailer frame, and in cooperation with at least a portion of said tongue to provide lateral and vertical support for the frame.

7. For use with a trailer to be towed behind a towing vehicle having a hitch on a hitch support, said trailer having ground engaging wheels mounted on an axle and a support structure mounted on said axle, a trailer frame for supporting a trailer deck comprising;
   a plurality of integrally formed frame members affixed in a predetermined frame structure and each having trailer deck support surfaces; and
   an elongated tongue structure coupled to said frame structure, said tongue structure having a predetermined cross-section and including a pair of opposed longitudinal channels extending along at least a portion of its length, whereby said pair of opposed longitudinal channels can cooperate with the hitch support on the towing vehicle for avoiding damage to said tongue structure during turning of the towing vehicle.

8. A trailer frame as in claim 7, and further including a rear channel member affixed to said frame structure, said rear channel member including an additional trailer deck support surface and having an integrally formed ramp surface at a predetermined angle and in cooperative relationship to said additional trailer deck support surface and arranged for protecting the rear edge of the trailer deck.

9. A trailer frame as in claim 7, and further including an integrally formed tongue mount channel affixed to said frame structure and in cooperative relationship with at least a portion of said elongated tongue structure to provide lateral and vertical support for said frame structure.

10. A trailer frame as in claim 9, wherein said plurality of frame members, said rear channel member, said tongue mount channel, and said tongue structure are each integrally formed from extruded light-weight material.

11. A trailer frame as in claim 10, wherein said light-weight material is extruded aluminum.

12. A trailer frame as in claim 7, wherein said plurality of internally formed frame members includes a front beam comprising a substantially rectangular open box beam structure having walls of predetermined thickness, and an upwardly extending edge-protecting portion in cooperative relationship to its associated said trailer deck supporting surface.

13. A trailer frame as in claim 8, wherein said rear channel member includes a lower member: a lip member formed at an angle to said lower member: an upper member having a rear-deck-edge-protecting surface substantially perpendicular to said additional trailer deck support surface, said rear-deck-edge-protecting surface having an upper edge in cooperative relationship with an associated portion of said ramp surface; a back web member having a first edge formed with said additional trailer deck support surface and a second edge formed with said lower member, wherein said lip member, said back web member and said support member define an open channel in which lights can be mounted.

14. A trailer frame as in claim 13 wherein said ramp surface is arranged downwardly extended at about forty-five degrees with respect to said rear-deck-edge-protecting surface, and said lip member is arranged upwardly extending at about forty-five degrees with respect to said lower member.

15. An elongated tongue structure as in claim 7, wherein said predetermined cross-section includes an upper member having two edges; a pair of downwardly extending side members each having an edge formed with an associated one of said two edges; a pair of inwardly extending members formed with associated ones of said pair of downwardly extending side members; a pair of inwardly extending members formed with associated ones of said spaced-apart downwardly extending channel members; a pair of outwardly extending members formed with associated ones of said pair of spaced-apart downwardly extending channel members; and a lower closure member formed between said pair of outwardly extending members, wherein associated ones of said pair of inwardly extending members, said pair of spaced-of spaced-apart downwardly extending members and said of outwardly extending members form said pair of opposed longitudinal channels.

16. A trailer frame as in claim 1, wherein said integrally formed rear channel member includes an upper member having rear-deck-edge-protecting surface substantially perpendicular to said second deck support surface, said rear-deck-edge-protecting surface having an upper edge in cooperative relation to said ramp surface; a back web member having a first edge formed with said second deck support surface and a second edge formed with said lower member, wherein said lip member has a lower surface adapted to engage the ground when the trailer frame is raised for loading, and wherein said lip member, said back web member and said support member define an open channel in which lights can be mounted.

17. A tongue as in claim 4, wherein said predetermined cross-section of said second portion includes an upper member having two edges; a pair of downwardly extending side members each having an edge formed with an associated one of said two edges; a pair of inwardly extending members formed with associated ones of said pair of downwardly extending side members; a pair of spaced-apart downwardly extending channel members formed with associated ones of said pair of inwardly extending members; a pair of outwardly extending members formed with associated ones of said pair of spaced-apart downwardly extending channel members; and a lower closure member formed between said pair of outwardly extending member, wherein associated ones of said pair of inwardly extending members, said pair of spaced-apart downwardly extending members and said pair of outwardly extending members form said pair of opposed longitudinal channels.

18. A trailer frame as in claim 1, wherein said tongue includes an upper member having two edges; a pair of downwardly extending side members each having an edge formed with an associated one of said two edges; a pair of inwardly extending members formed with associated ones of said pair of downwardly extending side members; a pair of spaced-apart downwardly extending channel members formed with associated ones of said pair of inwardly extending members; a pair of outwardly extending members formed with associated ones of said pair of spaced-apart downwardly extending channel members; and a lower closure member formed between said pair of outwardly extending members, wherein associated ones of said pair of inwardly extending members, said pair of spaced-apart downwardly extending members and said pair of outwardly extending members form said pair of longitudinal opposed channels.

* * * * *